US012650329B2

(12) United States Patent
Benatti et al.

(10) Patent No.: US 12,650,329 B2
(45) Date of Patent: Jun. 9, 2026

(54) TANK COMPRISING A DEVICE FOR MEASURING THE LEVEL OF FLUID, AND CORRESPONDING MEASURING METHOD

(71) Applicant: COROB S.P.A., San Felice Sul Panaro (IT)

(72) Inventors: Fabrizio Benatti, Cavezzo (IT); Giulio Gualtieri, Guiglia (IT); Maurizio Meschiari, Massa Finalese (IT)

(73) Assignee: COROB S.P.A., San Felice Sul Panaro (IT)

( * ) Notice: Subject to any disclaimer, the term of this patent is extended or adjusted under 35 U.S.C. 154(b) by 455 days.

(21) Appl. No.: 18/037,636

(22) PCT Filed: Nov. 26, 2021

(86) PCT No.: PCT/IT2021/050383
§ 371 (c)(1),
(2) Date: May 18, 2023

(87) PCT Pub. No.: WO2022/113143
PCT Pub. Date: Jun. 2, 2022

(65) Prior Publication Data
US 2024/0027254 A1 Jan. 25, 2024

(30) Foreign Application Priority Data

Nov. 26, 2020 (IT) ........................ 102020000028676

(51) Int. Cl.
*G01F 23/38* (2006.01)
*B01F 27/112* (2022.01)
(Continued)

(52) U.S. Cl.
CPC ............ *G01F 23/38* (2013.01); *B01F 27/112* (2022.01); *B01F 27/17* (2022.01); *B01F 35/2112* (2022.01); *G01F 23/0007* (2013.01)

(58) Field of Classification Search
CPC .......... G01F 23/32; G01F 23/36; G01F 23/38; B01F 35/2112
(Continued)

(56) References Cited

U.S. PATENT DOCUMENTS 3,463,405 A 8/1969 Shepherd
5,048,333 A * 9/1991 Bonnell .................. F27D 21/00
73/317
(Continued)

FOREIGN PATENT DOCUMENTS

CN 1414907 A 4/2003
CN 104587874 A 5/2015
(Continued)

OTHER PUBLICATIONS

International Search Report and Written Opinion corresponding to International Patent Application No. PCT/IT2021/050383, mailed Mar. 9, 2022.

*Primary Examiner* — David L Sorkin
(74) *Attorney, Agent, or Firm* — Kinney & Lange, P.A.

(57) ABSTRACT

Device (10) for measuring the level (L) of fluid (F) inside a tank (11) for containing said fluid (F), comprising at least one mobile level blade (12) positioned, during use, inside the tank (11) and at least one sensor (14) configured to detect at least one position of said level blade (12) and positioned, during use, outside the tank (11), wherein said level blade (12) is configured to interact with said sensor (14) in order to determine the level (L) of fluid (F) in the tank (11) in relation to a threshold level (LI), in correspondence with which said sensor (14) is preferably positioned.

18 Claims, 3 Drawing Sheets

(51) Int. Cl.
    *B01F 27/17*        (2022.01)
    *B01F 35/21*        (2022.01)
    *G01F 23/00*        (2022.01)

(58) Field of Classification Search
    USPC ............................................. 366/142, 153.1
    See application file for complete search history.

(56)                       References Cited

U.S. PATENT DOCUMENTS

| | | | | |
|---|---|---|---|---|
| 5,150,613 A * | 9/1992 | Etheridge | ............... | B02C 2/007 |
| | | | | 340/623 |
| 5,694,974 A * | 12/1997 | Niemiro | ................ | G01F 23/226 |
| | | | | 73/304 R |
| 6,199,428 B1 * | 3/2001 | Estevez-Garcia | ....... | G01F 23/72 |
| | | | | 73/317 |
| 6,485,171 B1 * | 11/2002 | Wang | .................... | G01F 23/226 |
| | | | | 73/290 R |
| 6,807,814 B1 | 10/2004 | Otani et al. | | |
| 8,032,255 B2 | 10/2011 | Phelan et al. | | |

FOREIGN PATENT DOCUMENTS

| | | |
|---|---|---|
| CN | 108 362 353 | 8/2018 |
| DE | 10 2011 086860 | 5/2013 |
| GB | 1146812 A | 3/1969 |
| WO | 2001/42014 | 6/2001 |

* cited by examiner

TANK COMPRISING A DEVICE FOR MEASURING THE LEVEL OF FLUID, AND CORRESPONDING MEASURING METHOD

FIELD OF THE INVENTION

The present invention concerns a tank comprising a device for measuring the level of fluid contained therein.

The present invention also concerns a method to measure the level of fluid in a tank by means of said measuring device.

In particular, the tank can be a tank for containing fluid products such as coloring liquids, bases for paints, varnishes, enamels, inks and suchlike, suitable to be installed on machines for dispensing or distributing such fluid products.

In particular, the measuring device is able to detect at least one level of fluid in the tank, or at least a minimum level of fluid inside the tank.

BACKGROUND OF THE INVENTION

Machines for dispensing or distributing fluid products are known, such as dyes of different shades or colors, able to be mixed together and/or added to a base substance to make up a varnish or a paint of a determinate color.

Known machines normally comprise a plurality of containers containing a determinate dye, which can be selectively connected to one or more delivery nozzles and associated with respective pump means which cause the selective delivery of the fluid product contained therein in a suitably selected quantity, for example with the aid of an electronic processor.

Each container comprises inside it a stirring device, which can be selectively activated, able to prevent the heavier components present in the fluid from settling on the bottom of the container itself, with a consequent undesired drying of the fluid. The stirring device is also able to prevent the various components present in the fluid—typically characterized by different densities/viscosities—from separating, in order to prevent product degradation.

To date, in dispensing machines generally available on the market, in particular in those installed in points of sale, there is no system for the direct measurement of the quantity of dye present in each tank.

The level is typically recorded manually by the user when filling the tank and then the software system to manage and control the machine keeps track of it, based on the subsequent dispensing of quantities that are made. Clearly this system has obvious limits of potential misalignments between the actual value inside the tank and the "theoretical" value present in the system, mainly due to possible errors or oversights by the operator.

A misalignment error regarding the theoretical and real quantity of dye in the tank can lead to dispensing being started, because the system believes there is enough product in the tank, when in reality there is not enough. This situation, which as of today cannot be intercepted and verifiable, creates an incorrect dispensing, which is naturally undesirable for the customer and end user, in terms of costs and the wrong quantity of product received.

In some applications, for example industrial applications, where required, pressure sensors are used that detect the quantity of product inside the tank, since the specific weight of the product and the tare weight are known. This system has various limitations, including the high cost, the need for setting, the need to create a complex "floating" system able to be sensitive to pressure.

Other known systems provide to use sensors "in contact" with the fluid, which however are specific for a determinate type of fluid but which adapt with difficulty to fluids of a different kind, for example different types of dye, or other fluids with different viscosity.

There are also capacitive sensors that determine the presence or absence of dye. However, these systems are complex, expensive and do not guarantee an optimal detection of at least a determinate level of fluid inside the tank, for example a minimum level of fluid that should be readily detected by the control system of the dispensing machine.

There is therefore a need to perfect a device for measuring the level of fluid in a tank, and a tank comprising said measuring device which can overcome at least one of the disadvantages of the state of the art.

In particular, one purpose of the present invention is to provide a device for measuring the level of fluid in a tank which is efficient, economical and can be applied in any type of tank and with any type of fluid present in the tank, in particular but not exclusively, coloring liquids, bases for paints, varnishes, enamels, inks and suchlike.

Another purpose of the present invention is to provide a device for measuring the level of fluid in a tank in which the sensor able to detect the level of fluid, in particular when a certain level of fluid is reached, is not in direct contact with the fluid to be measured.

Another purpose of the present invention is to provide a tank to contain a fluid product to which a device for measuring the level of fluid can be applied, irrespective of the shape and size of the tank and irrespective of the nature of the fluid contained.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes and according to the present invention, a tank for containing a fluid comprises both one or more stirring blades able to rotate by means of corresponding drive means in order to stir the fluid contained in the tank, and also a device for measuring the level of fluid contained in the tank.

The device for measuring the level of fluid comprises at least one mobile level blade positioned during use inside the tank, and at least one sensor configured to detect at least one position of the level blade and positioned during use outside the tank. The level blade is configured to interact with the sensor in order to determine the level of fluid in the tank in relation to a threshold level, in correspondence with which the sensor can preferably be positioned. The level blade is configured to alternatively assume a first operating configuration when the level of fluid in the tank is greater than or equal to the threshold level, and a second operating configuration when the level of fluid in the tank falls below such threshold level; the relative position between the level blade and the sensor thus varying in the passage from the first operating configuration to the second operating configuration, which allows to detect a variation of interaction between the level blade and the sensor, which is indicative of the lowering of the level of fluid below the threshold level.

In one particular embodiment, in the first operating configuration the level blade is disposed substantially vertically, while in the second embodiment it is disposed substantially horizontally or inclined by an angle smaller than about 60°, preferably approximately equal to 45°.

Advantageously, the present device, equipped with a level blade which is lowered when the level of fluid in the tank falls below a threshold level and also equipped with a sensor interacting with the level blade, is efficient, economical and can be applied in any type of tank and with any type of fluid present in the tank, in particular but not exclusively coloring liquids, bases for paints, varnishes, enamels, inks and such-like. Furthermore, the sensor is not in direct contact with the fluid contained in the tank.

According to other aspects of the invention, the level blade can be provided with at least one magnet and the sensor can be a magnetic sensor; such magnet is positioned substantially at the same height as the sensor.

In other embodiments, the level blade can be made, in whole or in part, of metal material and the sensor can be an inductive sensor.

In other embodiments, the sensor can be a capacitive sensor configured to detect the capacitance variation due to the movement of the level blade.

The level blade can also comprise at least one sensor configured to measure its position.

According to other aspects of the invention, the level blade can be angularly pivoting around a pin, and comprise an upper part and a lower part with respect to the pin. The magnet, if provided, will in this case be positioned on the upper part of the level blade.

In particular, the level blade can pivot around the pin at least from a first substantially vertical position, in which the level of fluid is higher than the threshold level, to at least a second substantially horizontal or inclined position, in which the level of fluid is lower than the threshold level, or vice versa.

In particular, the level blade is configured to angularly pivot freely around the pin, since it is mounted idle on the latter.

The level blade can be made with resistant plastic material, such as for example one or more polymers of a technical type, or steel, or stainless steel, or an aluminum alloy.

According to other aspects of the invention, the level blade of the measuring device is integral with the stirring blades.

The level blade can also be positioned between at least two stirring blades located in succession, so as to substantially occupy, at least partly, the empty space between the two stirring blades.

The upper part of the level blade can comprise at least one segment interfering with an upper stirring blade.

The lower part of the level blade can comprise at least one segment interfering with a lower stirring blade.

In the present tank, the position of the pin around which the level blade angularly pivots can also be adjustable in height so as to detect a desired level of fluid.

Another aspect of the present invention concerns a method to measure the level of fluid inside a tank for containing the fluid comprising one or more stirring blades able to rotate around an axis of rotation of their own by means of corresponding drive means in order to stir the fluid, wherein the method provides the positioning of at least one mobile level blade inside the tank and the positioning outside the tank of at least one sensor configured to detect at least one position of the level blade, wherein the level blade is configured to interact with the sensor in order to determine the level of fluid in the tank in relation to a threshold level, in correspondence with which the sensor is preferably positioned. The method according to the present invention provides that the level blade alternatively assumes, in an automatic way, that is, without any external actuation, a first operating configuration when the level of fluid in the tank is greater than or equal to the threshold level, and a second operating configuration when the level of fluid in the tank falls below such threshold level; wherein the method also provides that the relative position of the level blade varies with respect to the sensor in the passage from the first operating configuration to the second operating configuration, which allows to detect a variation of interaction between the level blade and the sensor which is indicative of the lowering of level of fluid below the threshold level.

According to another aspect, the method according to the present invention provides that the movement of the level blade between the first and the second operating configuration is obtained by driving in rotation, by means of the drive means, the stirring blade to which the level blade is integrally fixed. In this embodiment, the rotation of the stirring blade around its own axis of rotation determines the movement of the level blade between the two configurations as above, as a function of the level of fluid as described above.

According to another aspect, the method according to the present invention provides to carry out at least one rotation of the stirring blades in order to determine the movement of the level blade between the first operating configuration, in which the level blade is disposed in a first substantially vertical position, and the second operating configuration, in which the level blade is disposed in a second substantially horizontal or inclined position, preferably by an angle smaller than 60°, in particular approximately equal to 45°.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
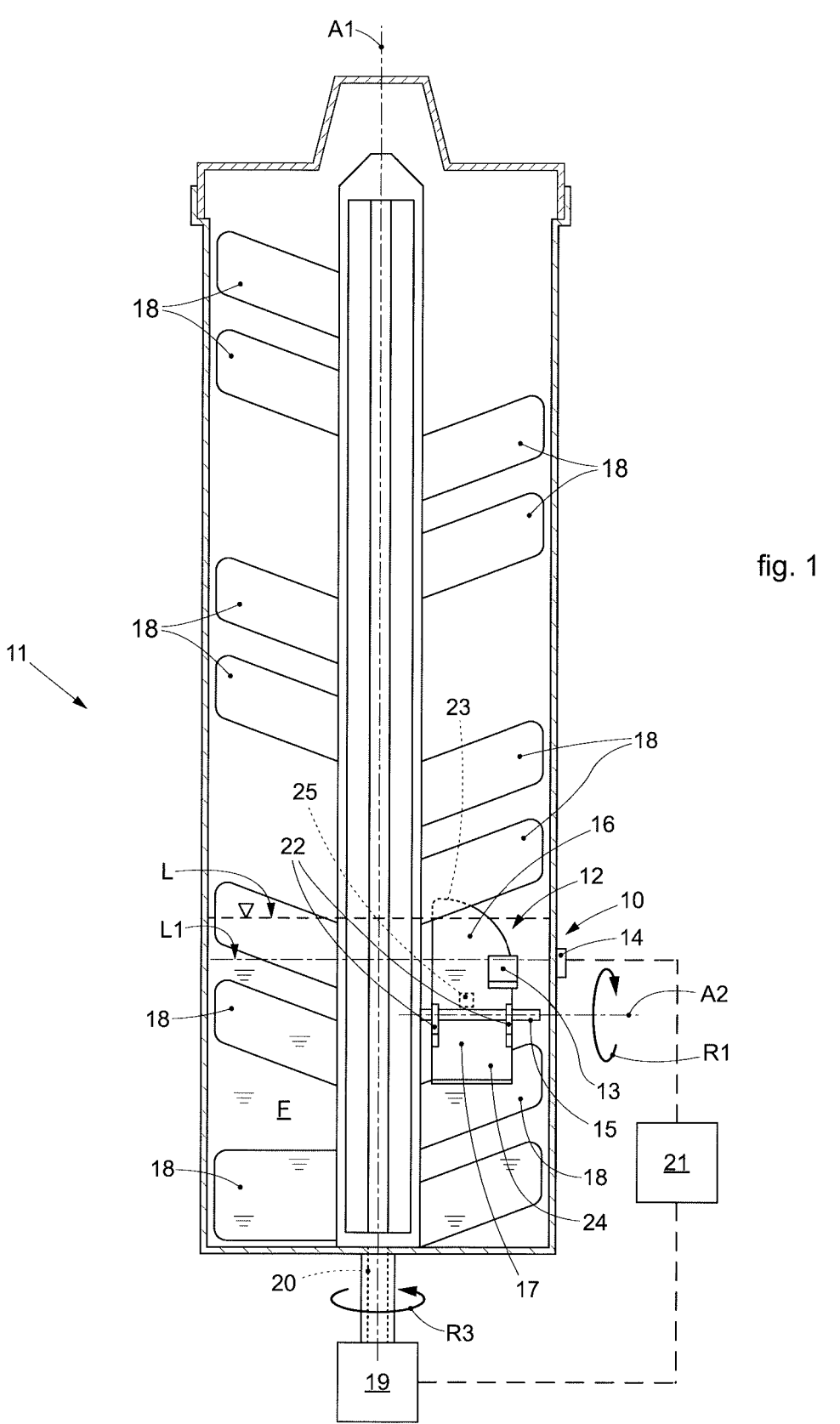
FIG. 1 is a schematic, lateral, longitudinal section view of a tank for containing a fluid in which there is positioned a device for measuring the level of the fluid according to the present invention.

To facilitate comprehension, the same reference numbers have been used, where possible, to identify identical common elements in the drawings. It is understood that elements and characteristics of one embodiment can be conveniently combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

Figure 3:
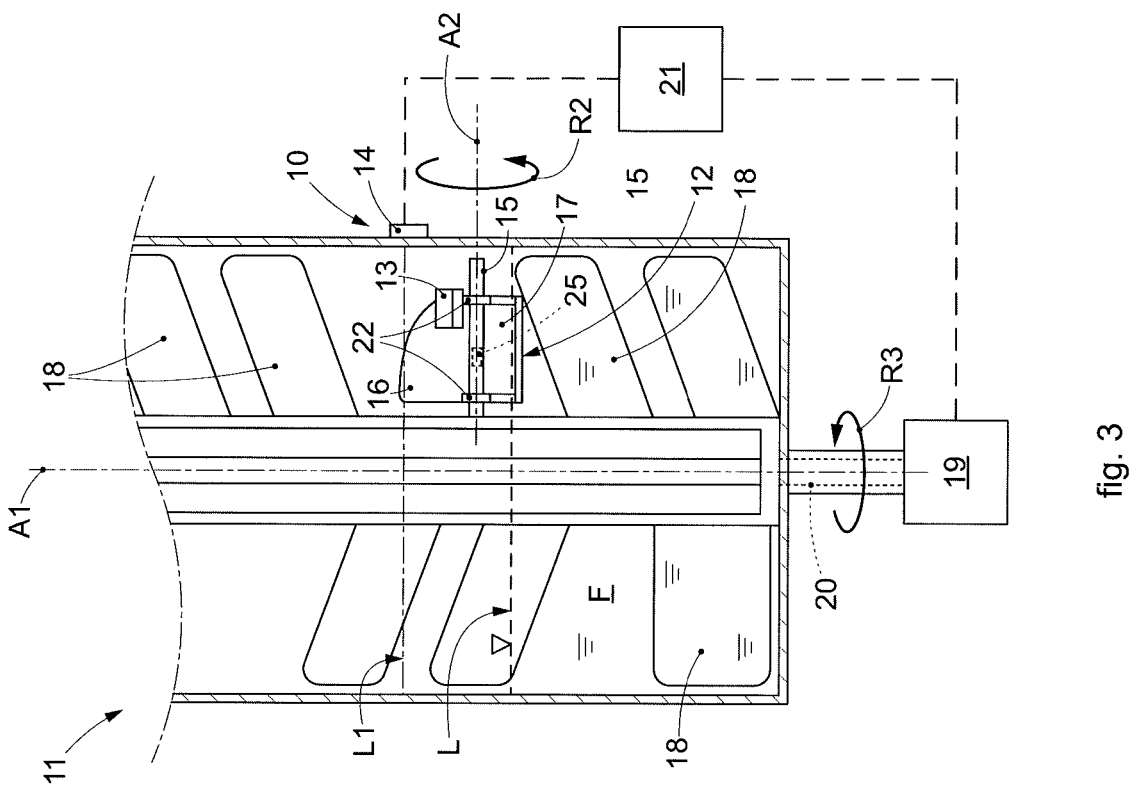
FIGS. 2 and 3 are schematic, lateral, partly sectioned views of a lower part of the tank of FIG. 1, which show the measuring device in two different operating conditions, as a function of the level of the fluid to be monitored.
Figure 2:
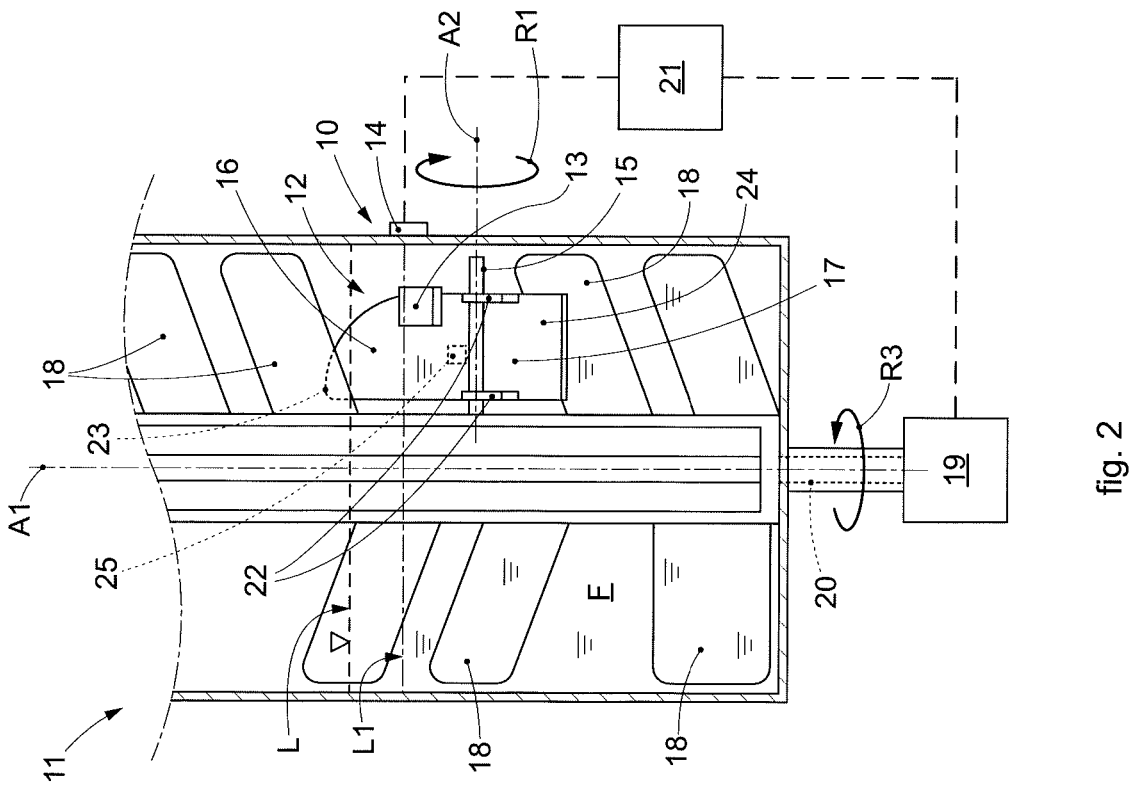

With reference to the attached drawings, FIGS. 2 and 3 show a device 10 according to the present invention for measuring the level L of fluid F inside a tank 11 for containing the fluid F, visible in its entirety in FIG. 1.

The device 10 comprises at least one mobile level blade 12 positioned during use inside the tank 11 and at least one sensor 14, which is configured to detect at least one position of the level blade 12 and is positioned during use outside the tank 11. The level blade 12 is configured to interact with the sensor 14 when the level L of fluid F in the tank 11 is greater than or equal to a level L1 of fluid F to be detected, also referred to hereafter in the description as threshold level. The level blade 12 is configured to lower when the level L of fluid F in the tank 11 falls below the level L1 to be detected, thus varying its interaction with the sensor 14 which detects such variation and therefore the lowering of the level L of fluid below the level L1.

The level L1 to be detected can be, for example, a minimum threshold level of fluid F inside the tank 11.

Moreover, the sensor 14 can be positioned substantially at the same height as the level L1 to be detected.

The level blade 12 can be provided with at least one magnet 13 and the sensor 14 can be a magnetic sensor. The magnet 13 is positioned substantially at the same height as the sensor 14 and possibly at the same height as the level L1 to be detected.

In other embodiments, the level blade 12 can be made entirely or in part of metal material and the sensor 14 can be an inductive sensor that detects the movement of the level blade 12.

In other embodiments, the sensor 14 can be a capacitive sensor configured to detect the change in capacitance of the level blade 12 due to the movement of the level blade 12.

The level blade 12 can also comprise at least one sensor 25 configured to measure its position. The sensor 25 can be an electric end of travel element, an inclination sensor, a torque meter or other.

The level blade 12 can be angularly pivoting freely around a pin 15, being mounted idle on the pin 15. The level blade 12 comprises an upper part 16 and a lower part 17 with respect to the pin 15, both of which can be configured as fins that project from opposite parts, one with respect to the other, from the pin 15, being in fact disposed angularly offset by about 180° with respect to each other, with reference to the axis of the pin 15.

In one embodiment, the magnet 13 is positioned on the upper part 16 of the level blade 12. In this case, the lower part 17 can have a counterweight function for the level blade 12.

In alternative embodiments, the level blade 12 could be associated with an element floating in the fluid F at the level L1, therefore in such a way that the magnet 13 can interact with the sensor 14 as long as the level L of fluid F is greater than or equal to level L1. The level blade 12 could then lower and move to a height lower than level L1 and lower than the sensor 14 when the level L of fluid F is lower than level L1, thus interrupting the interaction between the magnet 13 and the sensor 14.

The sensor 14 used can be for example a magnetic sensor provided with a foil electric contact which is normally open and which closes in the presence of a magnetic field, therefore when the magnet 13 is in the proximity of the sensor 14 and interacts with the latter, as in FIG. 1. Alternatively, the sensor 14 could be a Hall-effect or magneto-resistive magnetic sensor, provided with greater sensitivity.

According to some embodiments, the level blade 12 can angularly pivoting around the pin 15 at least from a first substantially vertical position, in which the level L of fluid F is higher than the level L1, to at least a second substantially horizontal or inclined position, preferably by an angle equal to approximately in which the level L of fluid F is lower than the level L1, or vice versa. The pivoting pin 15 of the level blade 12 can be directed substantially in the horizontal direction.

The level blade 12 can be made by means of durable plastic, or steel, or stainless steel, or an aluminum alloy. The level blade 12 could also be of a different shape from what is shown, for example rectangular or other.

The tank 11 according to the present invention comprises one or more stirring blades 18 able to rotate around an axis of rotation A1 by means of corresponding drive means 19, and to stir the fluid F contained in the tank 11. A device 10 for measuring the level L of fluid F as described above is housed in the tank 11.

The stirring blades 18 can be suitably disposed on one side and on the other with respect to a rotation shaft 20 directed along the axis A1 and associated with the drive means 19. The stirring blades 18 can be horizontal or suitably inclined, as shown by way of example in FIGS. 1-3.

The axis of rotation A1 can be substantially vertical, defining a longitudinal direction of the tank 11.

With reference to the embodiment shown in FIGS. 1-3, the tank 11 can have a substantially cylindrical shape and the axis A1 can be the axis of symmetry of the tank 11.

Figure 4:
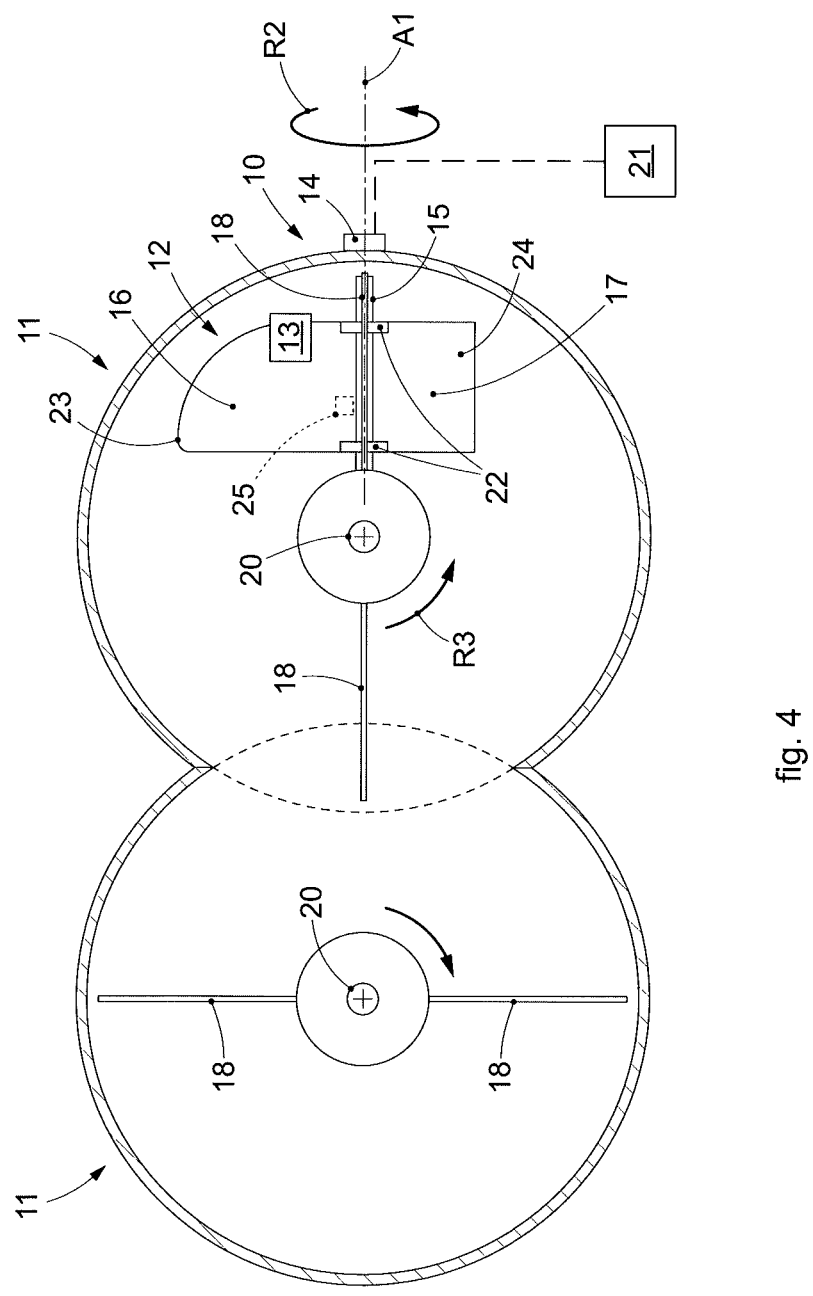
FIG. 4 is a schematic top plan view of a variant of the tank of FIG. 1, which also comprises a device for measuring the level of the fluid according to the present invention shown in a first operating configuration.

With reference to the variant shown in FIG. 4, the tank 11 can have the shape of an "8", seen in plan view from above, that is, being formed by two cylinders interpenetrating each other, as described for example in patent documents EP 1744826 and U.S. Ser. No. 10/751,679 of the same Applicant.

The drive means 19, as well as the sensor 14, can be connected to a control system 21. The control system 21 can be part of a dispensing machine, in which one or more tanks 11 can be provided, each of which can be equipped with its own device 10 for measuring the level L of fluid F. The sensor 14 and the drive means 19 communicate with the control system 21 in order to receive or transmit information, according to modes known in the state of the art and not described in detail here, in order to determine the correct functioning of the machine. For example, the sensor 14 communicates to the control system 21 a signal indicative of the interaction between the level blade 12 and the sensor 14, which allows the control system 21 to know whether the level blade 12 is in the first or in the second operating configuration.

The level blade 12 of the device 10 is preferably integral with the stirring blades 18.

The pivoting pin 15 of the level blade 12 can for example be fixed to the shaft 20. The level blade 12 can comprise coupling elements 22 suitable to allow its positioning on the fixed pin 15, for example two snap-in coupling elements 22 or other.

The level blade 12 could also be equipped with its own support structure which is fixed to shaft 20.

The pivoting pin 15 of the level blade 12 can be directed along an axis A2 substantially orthogonal to the axis of rotation A1 of the stirring blades 18.

The level blade 12 can be positioned between at least two stirring blades 18 located in succession, in such a way as to substantially occupy, at least partly, the empty space between the two stirring blades 18.

The upper part 16 of the level blade 12 can comprise at least one segment 23 interfering with an upper stirring blade 18.

The lower part 17 of the level blade 12 can comprise at least one segment 24 interfering with a lower stirring blade 18.

The provision of at least one segment 23 or 24, or of both segments 23 and 24, as shown, allows the level blade 12 to rotate in the direction R1 from the first position, shown in FIGS. 1 and 2, to the second position shown in FIG. 3, or vice versa, see arrow R2, but not to go beyond the first substantially vertical position during the rotation in the direction R2. In particular, the segment 23 will abut with a rear surface of the upper stirring blade 18 and the segment 24 will abut with a front surface of the lower stirring blade 18, as shown by way of example in FIG. 1.

As stated, and as can be understood, the limitation of the rotation in direction R2 in such a way that the level blade 12 cannot go beyond the substantially vertical position of FIGS. 1 and 2 can also be obtained with only one of the two interference segments 23 or 24.

The position of the pin 15 around which the level blade 12 can pivot, as well as the position of the sensor 14, can be adjustable in height, in such a way that the height of the level L1 to be detected can be substantially adjusted.

The stirring blades 18 are rotated around the axis A1 in the direction R3 in order to stir the fluid F contained in the tank 11. The level blade 12 rotates together with the stirring blades 18 and contributes to the stirring of the fluid F.

When the level L of the fluid F in the tank 11 is greater than or equal to the height at which the sensor 14 is positioned, that is, the level L1 to be detected, the level blade 12 is positioned vertically and the magnet 13 is substantially at the same height as the sensor 14. In this situation, the sensor 14 detects the magnetic field generated by the magnet 13 at each pass, therefore at each revolution of the level blade 12.

When the stirring blades 18 are activated and the level L of the fluid F in the tank 11 is lower than the height at which the sensor 14 is positioned, that is, the level L1 to be detected, the level blade 12 inclines significantly, for example moving to approximately 45° or more, until it is disposed almost horizontally. When it is in this position, the magnetic sensor does not detect the magnetic field generated by the magnet 13. In fact, the magnet 13 is at a lower level than the level L1 and the level of the sensor 14, therefore the sensor 14 does not detect any signal when the level blade 12 passes.

As stated, the sensor 14 can be interfaced with the control system 21 of a dispensing machine which gathers the signal and supplies it to a software controlling the machine, in order to provide the status of such level L of the tank 11 or of the levels of the various tanks, if there is more than one. For example, each tank 11 of a dispensing machine can contain a determinate type of coloring fluid, bases for paints, varnishes, enamels, inks or other.

In some versions, when the level of the fluid in the tank falls below the level L1, it can be provided to carry out at least one rotation of the stirring blades 18 around their axis of rotation A1 in order to facilitate the movement of the level blade 12 from the first vertical position to the second position.

It is clear that modifications and/or additions of parts and/or steps may be made to the device 10 for measuring the level of a fluid F in a tank 11, to the tank 11 comprising such device 10, and to the method to measure the level as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. A tank for containing a fluid, the tank comprising:
   one or more stirring blades rotatable on a first axis in order to stir the fluid contained in the tank; and
   a device for measuring the level of fluid contained in the tank, wherein the device comprises at least one mobile level blade positioned, during use, inside the tank and configured to rotate with the one or more stirring blades on the first axis, and at least one sensor configured to detect at least one position of said level blade and positioned, during use, outside the tank;
   wherein said level blade, in order to determine the level of the fluid in relation to a threshold level, is configured to assume a first operating configuration when the level of the fluid is greater than or equal to said threshold level, and a second configuration when the level of the fluid falls below said threshold level, wherein the level blade is mounted on a pin and is configured to pivot on the pin between the first operating configuration and the second operating configuration; and
   wherein a position of the pin is adjustable along the first axis.

2. The tank as in claim 1, wherein said sensor is a magnetic sensor and said level blade is provided with at least one magnet positioned substantially at the same height as said sensor in at least one of said operating configurations.

3. The tank as in claim 1, wherein said level blade is made entirely or partly of metal material and said sensor is an inductive sensor.

4. The tank as in claim 1, wherein said sensor is a capacitive sensor configured to detect the change of capacitance of the level blade due to its movement.

5. The tank as in claim 1, wherein said level blade comprises at least one sensor configured to measure its position.

6. The tank as in claim 1, wherein said level blade is angularly pivoting around a pin and comprises an upper part and a lower part which are configured as fins that project from opposite parts, one with respect to the other, with respect to said pin so that the relative position of said blade with respect to said sensor varies in the passage from said first to said second operating configuration, which allows to detect a variation of interaction between said level blade and said sensor which is indicative of the lowering of the level of fluid below said threshold level.

7. The tank as in claim 6, wherein said level blade angularly pivots around said pin at least between a first substantially vertical position in which said level blade assumes said first operating configuration and said level is higher than said threshold level, to at least a second substantially horizontal or inclined position in which said level blade assumes said second operating configuration where said level is lower than said threshold level.

8. The tank as in claim 6, wherein said level blade is configured to angularly pivot freely around said pin, being mounted idle on said pin.

9. The tank as in claim 1, wherein said level blade is integral with said stirring blades.

10. The tank as in any claim 1, wherein said level blade is positioned between at least two stirring blades located in succession, so as to substantially occupy, at least partly, the empty space between said two stirring blades.

11. The tank as in claim 10, wherein an upper part of said level blade comprises at least one segment interfering with an upper stirring blade and/or a lower part of said level blade comprises at least one segment interfering with a lower stirring blade.

12. A method to measure the level of fluid contained inside a tank comprising one or more stirring blades able to rotate around an axis of rotation thereof in order to stir said fluid, wherein at least one mobile level blade is positioned inside the tank and at least one sensor is positioned outside said tank configured to detect at least one position of said level blade, the method comprising:

rotating the one or more stirring blades about the axis of rotation and rotating the level blade with the one or more stirring blades about the axis of rotation;

pivoting the level blade on a pivot axis oriented transverse to the axis of rotation from a first position in which the level blade is oriented vertically to a second position in which the level blade is disposed one of horizontally and inclined between horizontal and vertical based on the level of the fluid falling below a threshold level; and sensing, by the sensor, the fluid level being below the threshold level based on the level blade pivoting from the first position to the second position.

13. The method as in claim 12, further comprising: varying the relative position of said level blade with respect to said sensor in the passage from said first to said second operating configuration, in order to detect a variation of interaction between said level blade and said sensor which is indicative of the lowering of the level below said threshold level.

14. The method as in claim 12, further comprising carrying out at least one rotation of said stirring blades in order to determine the movement of said level blade between said first operating configuration, in which said level blade is disposed in a first substantially vertical position, and said second operating configuration, in which said level blade is disposed in a second substantially horizontal or inclined position.

15. A tank for containing a fluid, the tank comprising:

one or more stirring blades rotatable on a first axis in order to stir the fluid contained in the tank; and a device for measuring the level of fluid contained in the tank, wherein the device comprises at least one mobile level blade positioned, during use, inside the tank and at least one sensor configured to detect at least one position of said level blade and positioned, during use, outside the tank;

wherein the level blade, in order to determine the level of the fluid in relation to a threshold level, is configured to assume a first operating configuration when the level of the fluid is greater than or equal to said threshold level, and a second configuration when the level of the fluid falls below said threshold level; and wherein the level blade overlaps with a first stirring blade of the one or more stirring blades about the first axis with the level blade in the first operating configuration.

16. The tank of claim 15, wherein the one or more stirring blades extend from a shaft rotatable on the first axis, the level blade is connected to the shaft at a first location along the shaft, and the first stirring blade is connected to the shaft at a location vertically above the first location.

17. The tank of claim 16, wherein the level blade overlaps with a second stirring blade of the one or more stirring blades about the first axis with the level blade in the first operating configuration, and wherein the second stirring blade is connected to the shaft at a location vertically below the first location.

18. The tank of claim 15, wherein the level blade overlaps with a second stirring blade of the one or more stirring blades about the first axis with the level blade in the first operating configuration.

\* \* \* \* \*